(12) United States Patent
Brooker et al.

(10) Patent No.: US 9,229,724 B2
(45) Date of Patent: Jan. 5, 2016

(54) SERIALIZING WRAPPING TRACE BUFFER VIA A COMPARE-AND-SWAP INSTRUCTION

(71) Applicant: International Business Machines Corporation, Armonk, NY (US)

(72) Inventors: Christopher G. Brooker, New Paltz, NY (US); Steven M. Partlow, Beacon, NY (US)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 13/803,702

(22) Filed: Mar. 14, 2013

(65) Prior Publication Data

US 2014/0282558 A1    Sep. 18, 2014

(51) Int. Cl.
*G06F 9/38* (2006.01)
*G06F 9/52* (2006.01)

(52) U.S. Cl.
CPC ............ *G06F 9/3814* (2013.01); *G06F 9/3851* (2013.01); *G06F 9/52* (2013.01); *G06F 2209/521* (2013.01)

(58) Field of Classification Search
None
See application file for complete search history.

(56) References Cited

U.S. PATENT DOCUMENTS

| | | | |
|---|---|---|---|
| 5,887,167 A | 3/1999 | Sutton | |
| 7,953,120 B2 | 5/2011 | Moonen | |
| 8,095,727 B2 | 1/2012 | Rushworth et al. | |
| 8,219,979 B2 | 7/2012 | Yang | |
| 8,230,421 B2 | 7/2012 | Shavit et al. | |
| 2009/0204755 A1* | 8/2009 | Rushworth et al. | 711/110 |
| 2011/0072241 A1 | 3/2011 | Chen et al. | |
| 2012/0096055 A1 | 4/2012 | Lee et al. | |
| 2013/0086092 A1* | 4/2013 | James et al. | 707/758 |

OTHER PUBLICATIONS

Rushiagr, Compare-and-swap, Jan. 26, 2013, Wikipedia, pp. 1-5.*

* cited by examiner

*Primary Examiner* — Emerson Puente
*Assistant Examiner* — Zhi Chen
(74) *Attorney, Agent, or Firm* — Cantor Colburn LLP; William A. Kinnaman, Jr.

(57) ABSTRACT

Embodiments of the disclosure serializing wrapping of a circularly wrapping trace buffer via a compare-and-swap (CS) instruction by a method including executing a CS loop to advance to a location in the buffer indicated by a next free pointer. The method also includes incrementing a master wrap sequence number each time the next free pointer returns to a top of the buffer and executing another CS loop to increment a wrap number stored in a trace block corresponding to the location indicated by the next free pointer. Based upon determining that the wrap number stored in the trace block is one less than or equal to the master wrap sequence number, the method includes reserving space in a buffer associated with the trace block and storing the wrap number stored in the trace block as an old wrap number and incrementing a use-count of the trace block.

17 Claims, 5 Drawing Sheets

SERIALIZING WRAPPING TRACE BUFFER VIA A COMPARE-AND-SWAP INSTRUCTION

BACKGROUND

The present invention relates to circularly wrapping trace buffers, and more specifically, to methods and systems for serializing wrapping of a trace buffer via a compare-and-swap (CS) instruction.

Trace buffers are often split into blocks of storage which when full can be written externally and/or reused once all writers have finished adding data. In general, when concurrently writing to a circularly wrapping trace buffer from multiple threads, serialization is performed to reserve space and prevent wrapping of the buffer. However, when reserving space for a thread it is difficult to know if other threads are done before allowing wrapping back to that block. Accordingly, there is a risk of writing to a block that is currently being used by another thread.

Existing solutions include using a system lock to ensure that only one write can happen at a time and allowing a thread to reserve space to indicate interest in the current trace block. However, using and waiting for such a system lock can have a negative impact on system performance. Another existing solution is to disable all interrupts while reserving space so it is done quickly thereby minimizing the risk that buffers could wrap during processing. However, disabling interrupts could cause a thread to monopolize a processor and requires that all buffers be in real storage and not paged to an external device.

SUMMARY

Embodiments include a system for serializing wrapping of a circularly wrapping trace buffer via a compare-and-swap (CS) instruction the system including a processor, the processor configured to perform a method. The method includes, executing a first CS loop to advance to a location in the circularly wrapping trace buffer indicated by a next free pointer and incrementing a master wrap sequence number each time the next free pointer returns to a top of the circularly wrapping trace buffer. The method also includes executing a second CS loop to increment a wrap number stored in a trace block corresponding to the location indicated by the next free pointer. Based upon determining that the wrap number stored in the trace block is one less than or equal to the master wrap sequence number, the method includes reserving space in a buffer associated with the trace block and storing the wrap number stored in the trace block as an old wrap number and executing a third CS loop to increment a use-count of the trace block. Based upon determining that the wrap sequence number for the trace block is equal to the old wrap number, the method further includes executing a write of a data to the buffer associated with the trace block and decrementing the in-use counter of the trace block when the write is complete.

Embodiments include a computer system for serializing wrapping of a circularly wrapping trace buffer via a compare-and-swap (CS) instruction. The computer system includes a processor configured to execute a method including executing a first CS loop to advance to a location in the circularly wrapping trace buffer indicated by a next free pointer and incrementing a master wrap sequence number each time the next free pointer returns to a top of the circularly wrapping trace buffer. The method also includes executing a second CS loop to increment a wrap number stored in a trace block corresponding to the location indicated by the next free pointer. Based upon determining that the wrap number stored in the trace block is one less than or equal to the master wrap sequence number, the method includes reserving space in a buffer associated with the trace block and storing the wrap number stored in the trace block as an old wrap number and executing a third CS loop to increment a use-count of the trace block. Based upon determining that the wrap sequence number for the trace block is equal to the old wrap number, the method further includes executing a write of a data to the buffer associated with the trace block and decrementing the in-use counter of the trace block when the write is complete.

Embodiments also include a computer program product for serializing wrapping of a circularly wrapping trace buffer via a compare-and-swap (CS) instruction, the computer program product including a computer readable storage medium having computer readable program code embodied therewith. The computer readable program code including computer readable program code configured to perform a method. The method includes executing a first CS loop to advance to a location in the circularly wrapping trace buffer indicated by a next free pointer and incrementing a master wrap sequence number each time the next free pointer returns to a top of the circularly wrapping trace buffer. The method also includes executing a second CS loop to increment a wrap number stored in a trace block corresponding to the location indicated by the next free pointer. Based upon determining that the wrap number stored in the trace block is one less than or equal to the master wrap sequence number, the method includes reserving space in a buffer associated with the trace block and storing the wrap number stored in the trace block as an old wrap number and executing a third CS loop to increment a use-count of the trace block. Based upon determining that the wrap sequence number for the trace block is equal to the old wrap number, the method further includes executing a write of a data to the buffer associated with the trace block and decrementing the in-use counter of the trace block when the write is complete.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, a method for serializing the wrapping of trace buffers via a CS instruction is provided. The method includes keeping a master wrap sequence number for the trace buffer and a separate wrap number and in use counter for each block of the trace buffer. The method uses these variables to ensure that the space reserved by the CS instruction is not being used by another thread and to ensure that the trace buffer does not wrap between the reservation of space and the writing of the data to the reserved space. In exemplary embodiments, the method uses compare-and-swap loops to update the variables used and ensure proper operation of the trace buffer.

Figure 1:
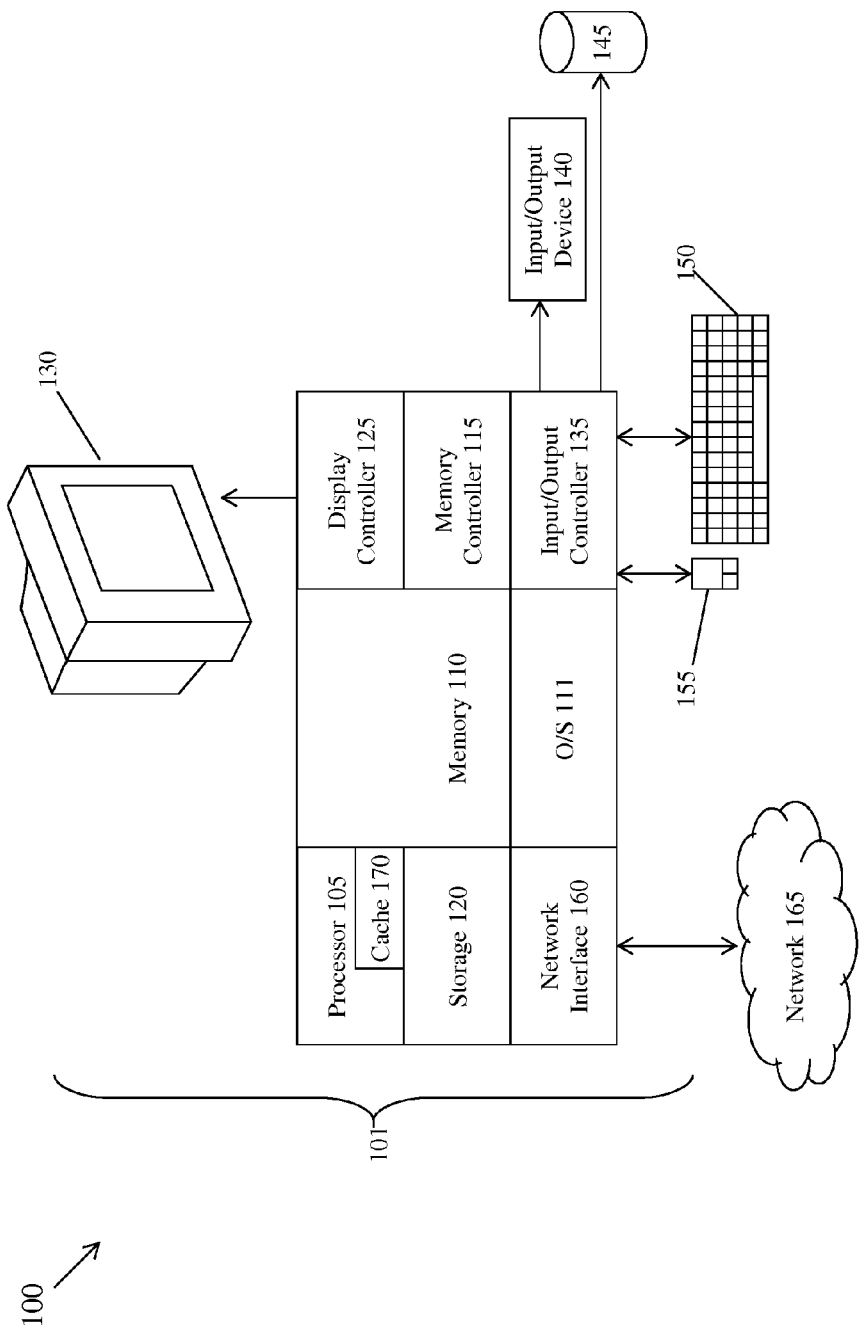
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

As used herein, a compare-and-swap (CS) instruction is an instruction that atomically updates a field, or set of contiguous fields, and can't be interrupted by another thread. The CS instruction includes both new and old values for the field and will only replace the current value in the field with the new value if the old value matches the current value. Upon execution of the CS instruction, an indication is set in the thread's condition code (CC) to indicate whether the field was updated successfully.

Figure 2:
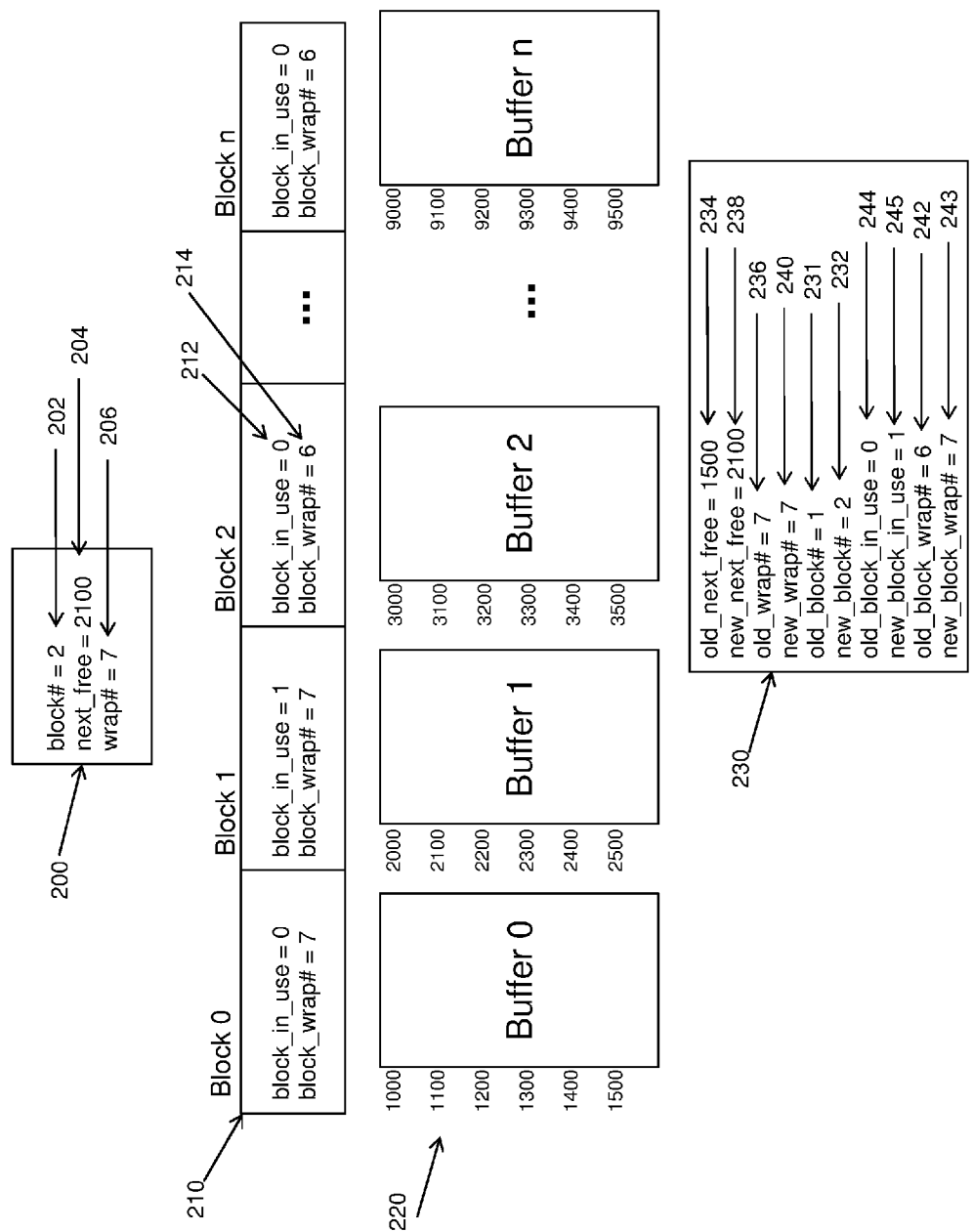
FIG. 2 illustrates a block diagram illustrating a system for serializing wrapping of a circularly wrapping trace buffer in accordance with an embodiment.

Referring now to FIG. 2, a block diagram illustrating a system for serializing wrapping of a circularly wrapping trace buffer is shown. The system includes a main control block 200 which includes a block number 202, a next free pointer 204 and a master wrap sequence number 206. In exemplary embodiments, the block number 202 indicates the trace block 210 corresponds to the buffer 220 that new data should be written to. In exemplary embodiments, the next free 204 is a pointer that indicates the location within the buffer 220 where data should be written. In exemplary embodiments, the master wrap sequence number 206 is a counter that is incremented each time the next free pointer 204 starts back at the top of the trace buffer, or block zero. In exemplary embodiments, the block number 202 and the next free pointer 204 may be combined into a single variable or pointer for identifying the location which new data should be written in the trace buffer.

The trace buffer includes a set of trace blocks 210 that contain trace data associated with each buffer 220. In exemplary embodiments, the trace data includes a block in use variable 212 and a block wrap number 214. The block in use variable 212 may be a variable that is used to determine how many threads are currently writing to the block and the block wrap number 214 is a variable that keeps track of how many times the buffer 220 has wrapped. The system also includes a local storage 230 for each thread/program that is adding data to the trace buffer, the local storage 230 includes new and old copies of each field it is updating via the CS instruction. In exemplary embodiments, the local storage 230 may also include old block number 231, a new block number 232, an old next free pointer 234, an old master wrap sequence number 236, a new next free pointer 238, a new wrap number 240, an old block wrap number 242, a new block wrap number 243, an old block in use 244 and a new block in use variable 245.

Figure 3A:
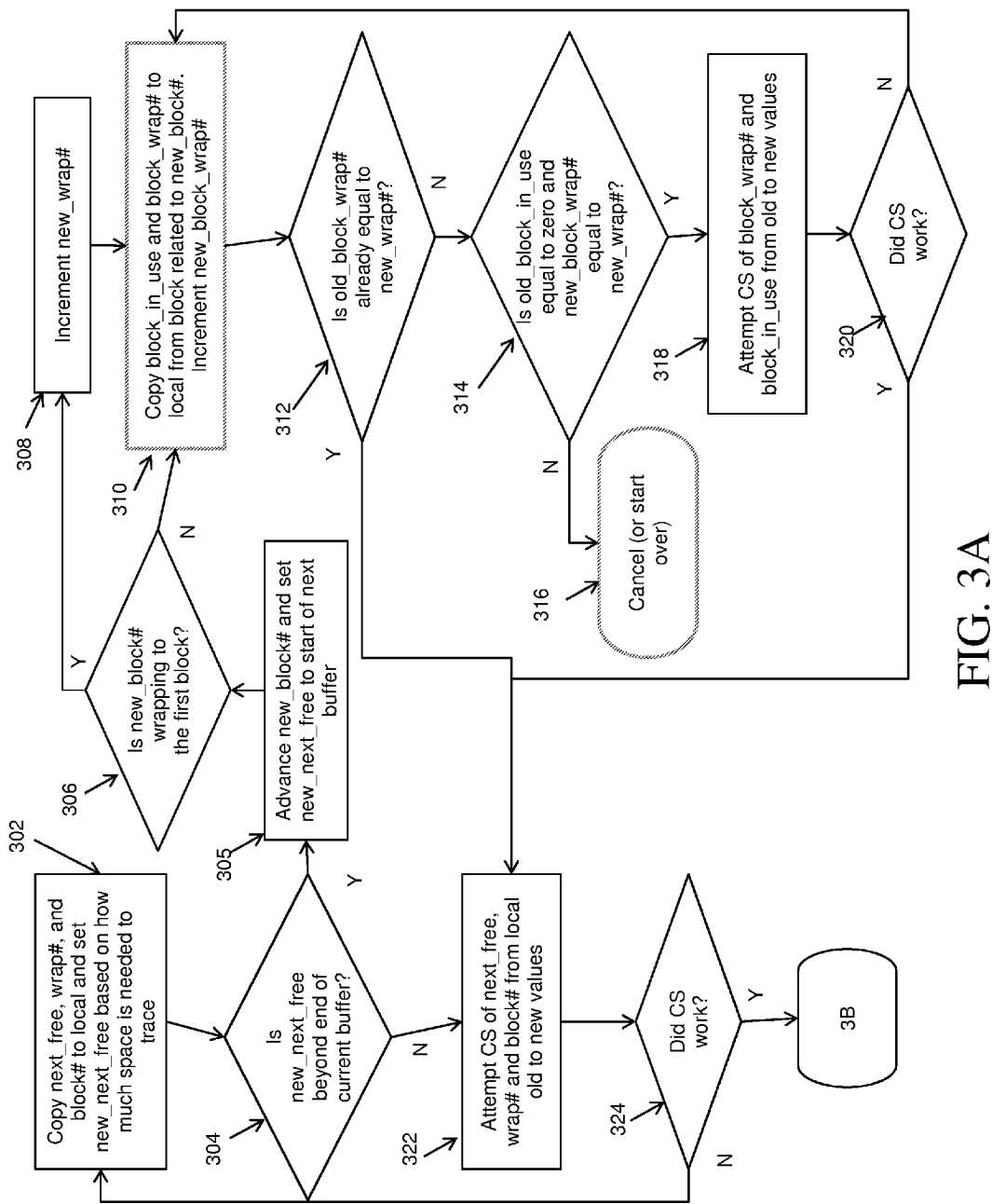
FIG. 3A illustrates a flow diagram of a method for serializing wrapping of a circularly wrapping trace buffer in accordance with an embodiment.

Referring now to FIG. 3A, a flow diagram illustrating a method for serializing wrapping of a circularly wrapping trace buffer via CS in accordance with an exemplary embodiment is shown. As shown at block 302, each thread wanting to add data to the trace buffer starts by copying the next free pointer (204), master wrap sequence number (206) and block number (202) from the main control block (200) into its local storage (230). The new next free pointer (238) is then calculated based on the old next free pointer (234) and the size of the data to be written. Next, as shown at decision block 304, the method includes determining if the new next free pointer (234) has advanced beyond the end of the current buffer (220). If the new next free pointer (234) has advanced beyond the end of the current buffer (220), the method proceeds to block 305 and sets the new block number (232) to one greater than the old block number (231) or to zero if already at the last block and sets the new next free pointer (238) to the start of the corresponding buffer (220). Otherwise, the method proceeds to block 322.

Continuing with reference to FIG. 3A, at decision block 306 it is determined if the new block number (232) is zero, which indicates that the trace buffer is wrapping to the first block. If the new block number (232) is zero, the method proceeds to block 308, and the new wrap number (240) is incremented. Otherwise, the method proceeds to block 310 and copies the block in use variable (212) and block wrap number (214) from the trace block (210) indicated by the new block number (232) to the local storage (230) and stores the values as old block in use (244) and old block wrap number (242) and increments the new block wrap number (243).

Next, as shown at decision block 312, it is determined if the new wrap number (240) is equal to the old block wrap number (242). If the new wrap number (240) is equal to the old block wrap number (242), then another thread has already updated this block for the new wrap number and the method proceeds to block 322. Otherwise, the method proceeds to decision block 314. At decision block 314, it is determined if the old block in use (244) is non-zero or if the new block wrap number (243) doesn't equal the new wrap number (240). If either of these conditions is met, another thread is still writing to this block's buffer or writing has fully wrapped since the thread began to write and the method proceeds to block 316 and concludes. Otherwise, the method proceeds to block 318 and attempts the CS on the block wrap number (214) and the block in use (212) related to the new block number (232) using the old and new data values from local storage (230).

At decision block 320, it is determined if the CS attempt was successful by checking the thread's condition code. If the CS attempt failed, the method returns to block 310. Otherwise, the method proceeds to block 322. At block 322 a CS is attempted on the next free pointer (204) and master wrap sequence number (206) in the main control block (200) using the old and new data values from local storage (230). At decision block 324, it is determined if the CS attempt was successful. If the CS failed, the method returns to block 302. Otherwise, the requested space was successfully reserved at new next free pointer (238) and the method proceeds to block 326.

Figure 3B:
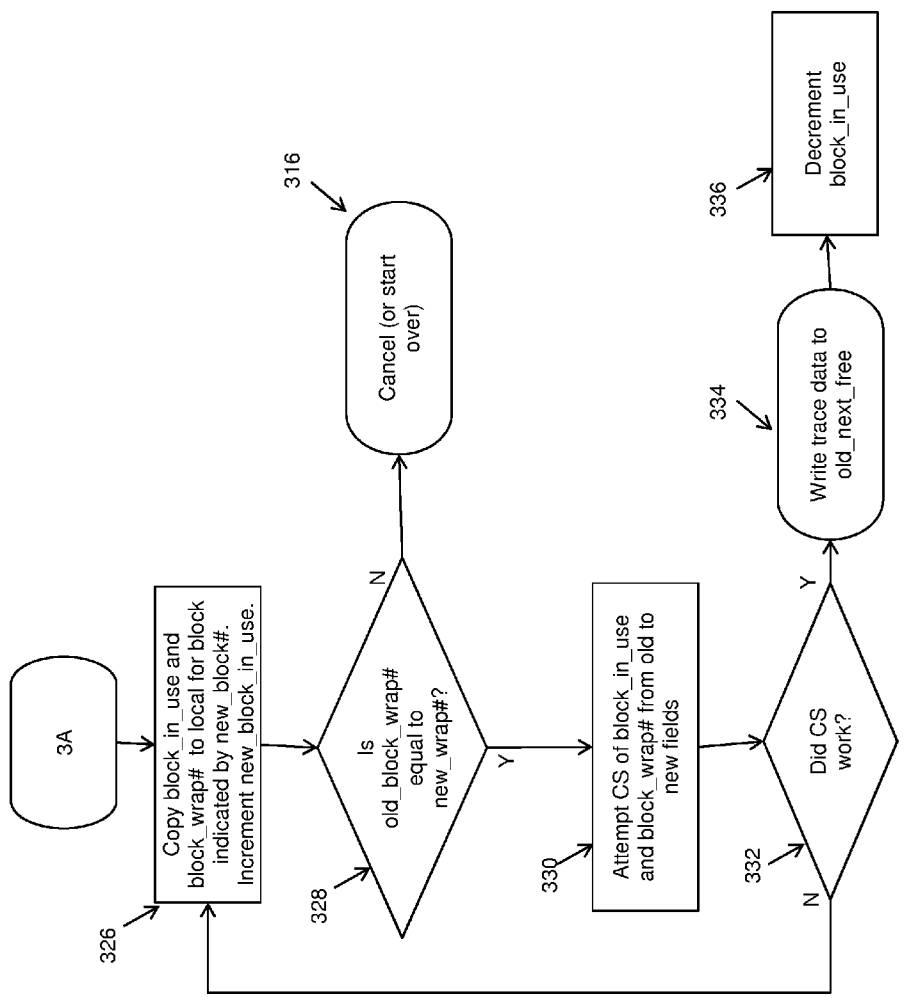
FIG. 3B illustrates a flow diagram of a method for serializing wrapping of a circularly wrapping trace buffer in accordance with an embodiment.

Continuing now with reference to FIG. 3B, at block 326 the block in use variable (212) and block wrap number (214) from the block indicated by the new block number (232) are copied to the local storage (230) and the values are stored as old block in use (244) and old block wrap number (242) and the new block in use variable (245) is incremented to indicate a thread is writing to the block's buffer to prevent wrapping. Next, at decision block 328 it is determined if the old block wrap number (242) is still equal to new wrap number (240). If the old block wrap number (242) is still equal to new wrap number (240), the method proceeds to block 330. Otherwise, the reservation is no good because the buffers have fully wrapped since the space was reserved and the method cancels at block 316.

At block 330, a CS attempt of the block in use variable (212) and block wrap number (214) using the old and new data values from local storage (230). At decision block 332, it is determined if the CS was successful. If the CS was not successful, the method proceeds to block 326. If the CS was successful, then the method proceeds to block 334. At block 334, the new data is written to the trace buffer pointed to by the old next free pointer (234). After the write has been completed, the method concludes at block 336 by decrementing the block in use variable (212) using CS.

Figure 4:
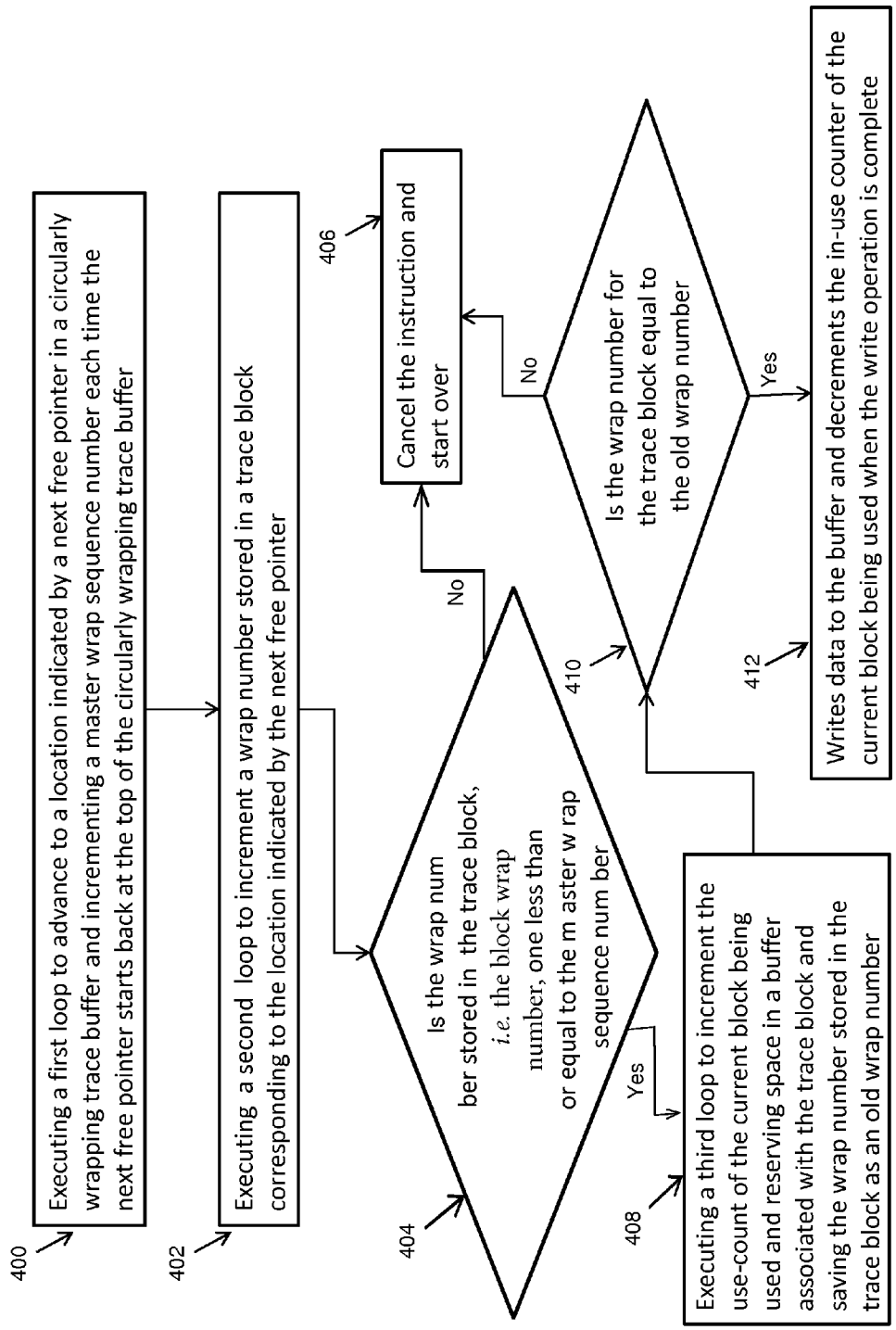
FIG. 4 illustrates a flow diagram of a method for serializing wrapping of a circularly wrapping trace buffer in accordance with another embodiment.

Referring now to FIG. 4, a high level flow diagram illustrating a method for serializing wrapping of a circularly wrapping trace buffer via CS in accordance with an exemplary embodiment is shown. As shown at block 400, the method includes executing a first loop to advance to a location in the circularly wrapping trace buffer indicated by the next free pointer and to increment a master wrap sequence number each time the pointer starts back at the top of the circularly wrapping trace buffer. As shown at block 402, the method includes the execution of a second loop, which may be nested inside the first loop, to increment the wrap number stored in the trace block into which next free pointer points to match the master wrap sequence number. At decision block 404, the method determines if the wrap number stored in the trace block is one less than or equal to the master wrap sequence number. If the wrap number stored in the trace block, i.e. the block wrap number, in not one less than or equal to the master wrap sequence number, then the buffer has wrapped and the current thread should cancel the trace operation and start over, as shown at block 406. Otherwise, the method has successfully reserved space for the current pass through the buffers and the method proceeds to block 408.

As shown at block 408, a third loop is executed to increment an in-use counter of the current block being used and to reserve space in a buffer associated with the trace block by saving the wrap number stored in the trace block as an old wrap number. The third loop is also used to check that the wrap number for the current block is the same for which space was reserved the current thread by comparing the wrap number for the trace block to the old wrap number, as shown at decision block 410. If the wrap number for the current block is not the same for which space was reserved the current thread, the trace operation is canceled, as shown at block 406. Otherwise, the method proceeds to block 412 and writes the data to the buffer and decrements the in-use counter of the current block being used when the write operation is complete.

In exemplary embodiments, the first loop may be used to identify the next available location in a circularly wrapping trace buffer thereby reserving space in the buffer. The second nested loop is used to update trace block variables to track wrapping of the buffer. The third loop is used to verify that the reservation made by the second loop is still valid and to write the data to the reserved location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for serializing wrapping of a circularly wrapping trace buffer via a compare-and-swap (CS) instruction, the method comprising:
    executing, by a processor, a first CS loop to advance to a location in the circularly wrapping trace buffer indicated by a next free pointer, wherein the circularly wrapping trace buffer includes a plurality of trace blocks;
    incrementing a master wrap sequence number each time the next free pointer returns to a top of the circularly wrapping trace buffer;
    executing a second CS loop to increment a block wrap number stored in one of the plurality of trace blocks corresponding to the location indicated by the next free pointer, wherein the second CS loop is a nested loop within the first CS loop;
    based upon determining that the block wrap number stored in the one of the plurality of trace blocks is one less than or equal to the master wrap sequence number, reserving space in a buffer associated with the one of the plurality of trace blocks and storing the block wrap number stored in the one of the plurality of trace blocks as an old wrap number;
    executing a third CS loop to increment an in-use counter of the one of the plurality of trace blocks;
    based upon determining that the block wrap number for one of the plurality of the trace blocks is equal to the old wrap number after the reserving, executing a write of a data to the buffer associated with the one of the plurality of trace blocks and decrementing the in-use counter of the one of the plurality of trace blocks when the write is complete.

2. The method of claim 1, further comprising based upon determining that the block wrap number stored in the one of the plurality of trace blocks is not one less than or equal to the master wrap sequence number, canceling the CS instruction.

3. The method of claim 1, further comprising based upon determining that the block wrap number for the one of the plurality of trace blocks is not equal to the old wrap number, canceling the CS instruction.

4. The method of claim 1, wherein the old wrap number is stored in a local storage of an application executing the CS instruction.

5. The method of claim 1, further comprising determining if the buffer associated with the location indicated by the next free pointer has enough space available for the data to be written.

6. The method of claim 5, based on determining that the buffer associated with the location indicated by the next free pointer does not has enough space available for the data to be written, updating the next free pointer to a start of a next one of the plurality of trace blocks.

7. A computer system for serializing wrapping of a circularly wrapping trace buffer via a compare-and-swap (CS) instruction comprising:
    a processor configured to perform a method comprising:
    executing a first CS loop to advance to a location in the circularly wrapping trace buffer indicated by a next free pointer, wherein the circularly wrapping trace buffer includes a plurality of trace blocks;
    incrementing a master wrap sequence number each time the next free pointer returns to a top of the circularly wrapping trace buffer;
    executing a second CS loop to increment a block wrap number stored in one of the plurality of trace blocks corresponding to the location indicated by the next free pointer, wherein the second CS loop is a nested loop within the first CS loop;
    based upon determining that the wrap number stored in the one of the plurality of trace blocks is one less than or equal to the master wrap sequence number, reserving space in a buffer associated with the one of the plurality of trace blocks and storing the wrap number stored in the one of the plurality of trace blocks as an old wrap number;
    executing a third CS loop to increment an in-use counter of the one of the plurality of trace blocks;
    based upon determining that the block wrap number for the one of the plurality of trace blocks is equal to the old wrap number after the reserving, executing a write of a data to the buffer associated with the one of the plurality of trace blocks and decrementing the in-use counter of the one of the plurality of trace blocks when the write is complete.

8. The computer system of claim 7, further comprising based upon determining that the block wrap number stored in the one of the plurality of trace blocks is not one less than or equal to the master wrap sequence number, canceling the CS instruction.

9. The computer system of claim 7, further comprising based upon determining that the block wrap number for the one of the plurality of trace blocks is not equal to the old wrap number, canceling the CS instruction.

10. The computer system of claim 7, wherein the old wrap number is stored in a local storage of an application executing the CS instruction.

11. The computer system of claim 7, further comprising determining if the buffer associated with the location indicated by the next free pointer has enough space available for the data to be written.

12. The computer system of claim 11, based on determining that the buffer associated with the location indicated by the next free pointer does not has enough space available for the data to be written, updating the next free pointer to a start of a next trace block.

13. A computer program product for serializing wrapping of a circularly wrapping trace buffer via a compare-and-swap (CS) instruction, the computer program product comprising:
   a non-transitory computer readable storage medium having computer readable program code embodied therewith, the computer readable program code comprising:
   computer readable program code configured for:
   executing a first CS loop to advance to a location in the circularly wrapping trace buffer indicated by a next free pointer, wherein the circularly wrapping trace buffer includes a plurality of trace blocks;
   incrementing a master wrap sequence number each time the next free pointer returns to a top of the circularly wrapping trace buffer;
   executing a second CS loop to increment a block wrap number stored in one of the plurality of trace blocks corresponding to the location indicated by the next free pointer, wherein the second CS loop is a nested loop within the first CS loop;
   based upon determining that the block wrap number stored in the one of the plurality of trace blocks is one less than or equal to the master wrap sequence number, reserving space in a buffer associated with the one of the plurality of trace blocks and storing the block wrap number stored in the one of the plurality of trace blocks as an old wrap number;
   executing a third CS loop to increment an in-use counter of the one of the plurality of trace blocks;
   based upon determining that the block wrap number for the one of the plurality of trace blocks is equal to the old wrap number after the reserving, executing a write of a data to the buffer associated with the one of the plurality of trace blocks and decrementing the in-use counter of the one of the plurality of trace blocks when the write is complete.

14. The computer program product of claim 13, further comprising based upon determining that the block wrap number stored in the trace block is not one less than or equal to the master wrap sequence number, canceling the CS instruction.

15. The computer program product of claim 13, further comprising based upon determining that the block wrap number for the one of the plurality of trace blocks is not equal to the old wrap number, canceling the CS instruction.

16. The computer program product of claim 13, further comprising determining if the buffer associated with the location indicated by the next free pointer has enough space available for the data to be written.

17. The computer program product of claim 16, based on determining that the buffer associated with the location indicated by the next free pointer does not has enough space available for the data to be written, updating the next free pointer to a start of a next one of the plurality of trace blocks.

\* \* \* \* \*